Patented Apr. 9, 1929.

1,708,544

UNITED STATES PATENT OFFICE.

WILHELM KUMMERER, OF BERLIN, GERMANY, ASSIGNOR TO GESELLSCHAFT FÜR DRAHTLOSE TELEGRAPHIE M. B. H. HALLESCHES, OF BERLIN, GERMANY.

METHOD AND ARRANGEMENT FOR ELECTRICAL MEASUREMENTS.

Application filed April 6, 1925, Serial No. 21,255, and in Germany April 7, 1924.

My invention relates to a method and arrangement for measuring frequency and for indicating variations in the frequency of alternating currents. It also embraces a method and means for the comparison of the phase relation of two alternating currents. It has for its object to provide such a method and arrangement that will function in a simple and efficient manner.

Other objects will be apparent from the following specification and claims when considered with the accompanying drawing in which the single figure represents the best embodiment known to me at this time.

The present invention relates to an arrangement adapted to determine variations in frequency of alternating current especially for high frequencies. By the aid of an arrangement made according to the invention, it is possible to measure wavelengths, phase angles of currents, to indicate speed variations, and to operate speed regulators. To use a dynamometer effect for measurements of this sort furnishes a sensitive method.

There is also utilized in the present invention the phase change occurring in the presence of detuning of an oscillation circuit with relation to an exciting source of oscillations. This is done in combination with a Wheatstone bridge arrangement which is so built that the resistances of the different bridge arms or branches are influenced by the phase-displaced currents of an exciting circuit and of an excited circuit. The supply of current to the bridge is such that in the presence of a phase displacement of the currents of exactly 90 degrees (quadrature) as occurring at resonance, the effective values of the currents flowing in the bridge arms are equal.

The bridge arms contain resistances which change with heating. The bridge furthermore is fed from a direct current source, so that the bridge arms, apart from the high frequency oscillations, are also traversed by direct current. By means of a direct current instrument the zero or balance position of the bridge arrangement can be adjusted and indicated. In the presence of variations in frequency, the effective (root mean square) value of the currents in the bridge arms is varied, and consequently their resistance. Therefore the zero position for the direct current is also changed since the balance of the bridge is changed. For a better explanation of the invention, reference may be had to the accompanying drawing, in which Figure 1 is an arrangement for frequency measurement or comparison, while Figure 2 is a modification of the upper portion of Figure 1, employed for phase or frequency comparison of energies supplied over separate circuits.

Figure 1:
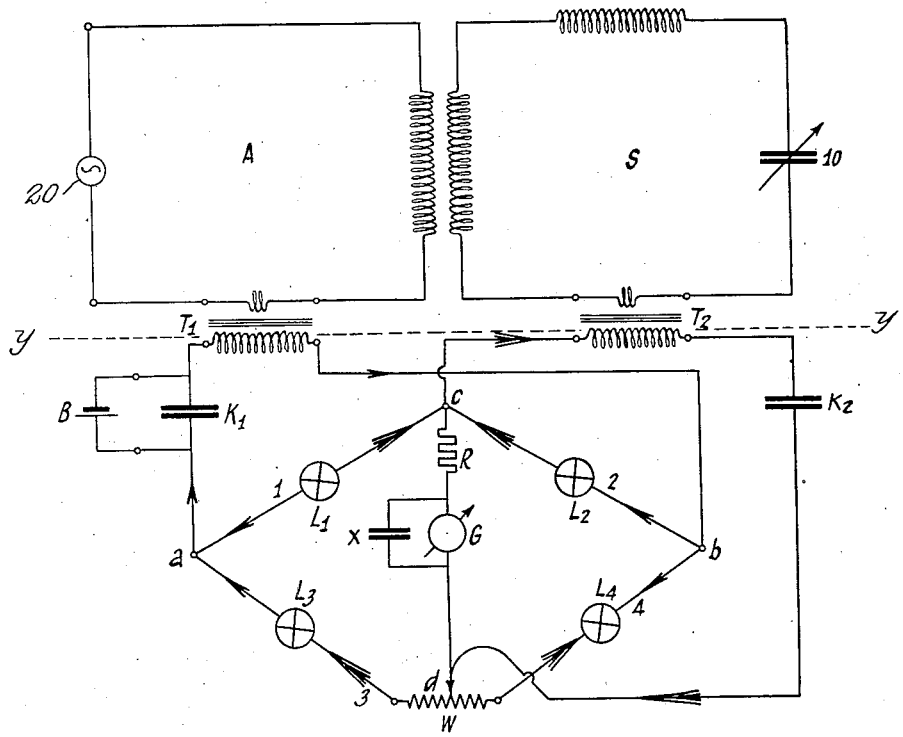
Figure 2:
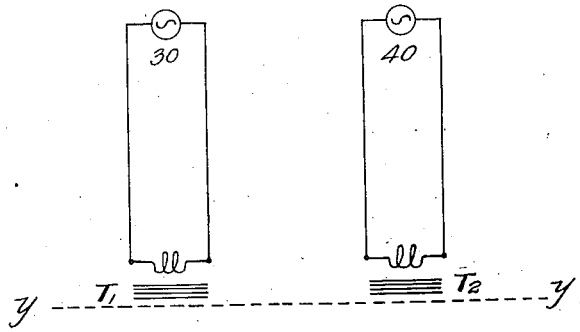

In Fig. 1, A is an exciting circuit to which the oscillation to be determined is fed from a source 20; S is a resonance circuit which can be built to constitute a standard, with which A is coupled loosely. 1, 2, 3, 4, represent four bridge arms comprising resistances variable by the strength of the currents traversing them, say, glow-lamps $L_1$, $L_2$, $L_3$, and $L_4$. High-frequency oscillations are supplied to the bridge, on the one hand by circuit A, at points $a$, $b$, and, on the other hand, by the circuit S, at the points $c$, $d$. The feeding of the bridge may conveniently take place by way of two iron-core transformers $T_1$ and $T_2$, as in this case there is a phase displacement of almost exactly 180 degrees between the currents in the primary winding and the secondary winding of the transformers, no additional phase angles being introduced by stray inductance.

The path of the currents set up in the bridge by the circuit A is indicated by the simple arrows, while the current set up by induction of the second circuit is marked by double-head arrows. It can be seen from the drawing that a summation of the currents takes place in branches or arms 2 and 3, while in arms 1 and 4 the difference between the currents is effective. Now, if the currents in circuit A and in circuit S are exactly displaced in their phases by an angle of 90 degrees, the same phase displacement exists also between the component currents in each bridge arm, and since they become added in a vectorial sense, the effective value in all arms of the bridge is the same.

B is a direct current battery. Between $c$ and $d$ there is a direct current instrument G which is protected from high frequency oscillations by the parallel connection of a condenser X, and a resistor R, the latter serving to prevent the former from short circuiting alternating current energy. In the leads to the bridge there are inserted large capacities $K_1$ and $K_2$ which are intended to block the direct current while they constitute for high frequency alternating current such a low impedance that no appreciable phase displacement occurs. For exact balancing of the bridge there is also provided a resistance wire W, $d$ being a contact slide.

The measurement of a frequency is accomplished by the aid of this equipment in the following manner: First balancing of the bridge is brought about with direct current, and then balancing for alternating current is brought about. Thereupon circuit A is excited, and the condenser 10 of circuit S adjusted until the direct current instrument G indicates zero. This means that the resistances of lamps $L_1$, $L_2$, $L_3$, and $L_4$ satisfy the zero condition, in other words, that the two high frequency currents flowing through the lamps are exactly displaced by a phase angle of 90 degrees, and that, as a consequence, circuit S is in resonance, i. e., tuned, with the impressed oscillations. As the condenser 10 may be calibrated in terms of frequency, as in any wave meter circuit, the reading of the condenser 10 will show the frequency of the alternating current supplied to circuit A. If it is desired to compare the frequency in circuit A with a standard frequency then it is only necessary to have the condenser 10 set properly for the standard frequency, and then to watch galvanometer G for deflections from zero. The frequency of circuit A may then be regulated so as to keep the galvanometer from deflecting.

It is clear that the bridge circuit shown in the drawing is being utilized to compare or to measure phase relations. Thus, in place of circuit S being energized from circuit A, and the phase relation being utilized as a frequency measure, each of two separate circuits whose phase relation is to be determined might be coupled at $T_1$ and $T_2$. Then if their relative phase is quadrature, the balance of the bridge will be undisturbed. But for other phase relations the bridge will be unbalanced. In this manner the arrangement may be used as an indicator of variations of the frequency or speed of an alternator, such as the source 20, so that the speed may be adjusted.

Such a modification has been indicated in Figure 2, in which the line $yy$ corresponds to the line $yy$ in Figure 1, and the iron core transformers $T_1$ $T_2$ correspond to the transformers $T_1$ $T_2$ in Figure 1. In this case the transformers are connected to separate sources of energy 30 and 40. With the energies at phase quadrature the bridge will be balanced, as in the case of correct resonance with the arrangement shown in Figure 1. Upon changes of phase the bridge will be unbalanced, and the galvanometer G will be deflected. By suitable calibration the arrangement may be used to determine the phase angle between the currents in the circuits 30 and 40.

To determine the phase-displacements or frequency change, there may be used also a method different from the one just described. For example, in connection with the use of glow-lamps, the luminous intensity of the lamps could be compared. Thus, on the bridge shown in the drawing, the observer could simply watch the relative intensity of the light from a pair of lamps such as $L_1$ and $L_2$, or $L_3$ and $L_4$. If instead of being alike, lamps $L_2$ and $L_3$ should become brighter while lamps $L_1$ and $L_4$ become dimmer, then it is known that the phase relation between circuits A and S is not quadrature. In such case the direct current source and instrument may be dispensed with, and even a bridge arrangement is not essential, but is illustrative of one modification.

The method described is extremely sensitive so that frequency variations of one part in ten thousand are determinable.

Having described the best embodiment of my invention known to me at the present time, I am entitled to all modifications thereof as fall fairly within the scope of the following claims:

1. In combination, a source of alternating current energy, an exciter circuit fed by said source, a measuring circuit coupled thereto, and means including a Wheatstone bridge for indicating when said measuring circuit is in tune with said source.

2. In combination, a source of alternating current energy, an exciter circuit fed by said source, a measuring circuit coupled thereto, and means including a Wheatstone bridge for indicating a change in phase relation of the currents in said circuits.

3. In combination, an alternating current supply circuit, a syntonizable circuit coupled thereto, to act as a second supply circuit, a comparison circuit coupled to the supply circuits so that in part of the comparison circuit the supplied currents add, while in another part of said comparison circuit they subtract.

4. In combination, an alternating current supply circuit, a syntonizable circuit coupled thereto to act as a second supply circuit, a comparison circuit coupled to the supply circuits so that in part of the comparison circuit the supplied currents add, while in another part of said comparison circuit they subtract, and means responsive to variations of the currents in said comparison circuit.

5. In combination, an alternating current supply circuit, a syntonizable circuit coupled thereto to act as a second supply circuit, a comparison circuit coupled to the supply circuits so that in part of the comparison circuit the supplied currents add, while in another part of said comparison circuit they subtract, and means responsive to a difference in the currents in the parts of said comparison circuit.

6. In combination, a first circuit, a second circuit having adjustable tuning means, means for loosely coupling said first and second circuits, a Wheatstone bridge arrangement having resistances in its arms which vary with heating currents therethrough, a first supply circuit connected across a first pair of diametrically opposite corners of said bridge, a second supply circuit connected across a second pair of diametrically opposite corners of said bridge, a first coupling means for tightly coupling said first circuit to said first supply circuit, a second coupling means for tightly coupling said second circuit to said second supply circuit, and means for indicating when the currents in said first and second circuits are in quadrature.

7. In combination, an exciter circuit, a measuring circuit coupled thereto, a Wheatstone bridge having resistances in its arms which vary with the heating current therethrough, a first supply circuit connected across a first pair of diametrically opposite corners of said bridge and coupled to said exciter circuit, a second supply circuit connected across a second pair of diametrically opposite corners of said bridge and coupled to said measuring circuit, a source of direct current in said first supply circuit, and a direct current indicating device across said second pair of diametrically opposite corners.

8. The method of determining the phase relation of two alternating currents which consists in adding them vectorially, and subtracting them vectorially, and comparing the magnitudes of the resulting sum and difference.

9. The method of determining the phase relation of two alternating currents which consists in adding them vectorially, and subtracting them vectorially, separately utilizing the sum and difference currents for heating, and securing a response dependent upon variation in their relative heating effects.

10. The method of determining the phase relation of two alternating currents which consists in adding them vectorially, subtracting them vectorially, separately utilizing the sum and difference currents for heating resistances having appreciable temperature co-efficients, and securing a response dependent upon the relative variation of the resistances.

11. The method of determining when two alternating currents are at phase quadrature which consists in adding them vectorially and subtracting them vectorially and observing when the magnitudes of the sum and difference are the same.

12. The method of determining when two alternating currents are at phase quadrature which consists in adding them vectorially and subtracting them vectorially, separately utilizing the sum and difference currents for heating, and observing when their heating effects are the same.

13. The method of determining when two alternating currents are at phase quadrature which consists in adding them vectorially, and subtracting them vectorially, separately utilizing the sum and difference currents for heating resistances having appreciable temperature co-efficients, and observing when the resistances are equal.

14. The method of using a circuit tuned to a known frequency for gauging the magnitude, relative to said known frequency, of the frequency of supply energy by which said tuned circuit is energized, which consists in separately vectorially adding and subtracting currents obtained from the supply and from the tuned circuit, and comparing the magnitudes of the resulting sum and difference currents.

15. The method of using a circuit tuned to a known frequency for gauging the magnitude, relative to said known frequency, of the frequency of supply energy by which said tuned circuit is energized, which consists in separately vectorially adding and subtracting currents obtained from the supply and from the tuned circuit, separately utilizing the sum and difference currents for heating, and securing a response dependent upon variation in their relative heating effects.

16. The method of using a circuit tuned to a known frequency for gauging the magnitude, relative to said known frequency, of the frequency of supply energy by which said tuned circuit is energized, which consists in separately vectorially adding and subtracting currents obtained from the supply and from the tuned circuit, separately utilizing the sum and difference currents for heating resistances having appreciable temperature co-efficients, and securing a response dependent upon the relative variation of the resistances.

17. Apparatus for the measurement of frequency comprising a supply circuit, a circuit including a variable impedance coupled thereto and so tuned by the adjustment of the impedance that at a known frequency the current therein will experience a known phase displacement relative to the supply current, and whereby at other frequencies there will be a different phase displacement, a plurality of circuit branches so coupled to both the supply and tuned circuits that in one branch the currents obtained from the supply and tuned circuits are added vectorially, while in another they are subtracted vectorially, and means responsive to changes in the relative magnitudes of the sum and difference currents.

WILH. KUMMERER.